(12) United States Patent
Tanaka et al.

(10) Patent No.: US 6,419,859 B2
(45) Date of Patent: Jul. 16, 2002

(54) MOLD ASSEMBLY FOR FORMING OPHTHALMIC LENS OR LENS BLANK AND METHOD OF PRODUCING THE SAME USING THE MOLD ASSEMBLY

(75) Inventors: Yuki Tanaka, Nagoya; Chikai Kosaka, Seki, both of (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/754,000

(22) Filed: Jan. 3, 2001

(30) Foreign Application Priority Data

Jan. 17, 2000 (JP) ........................................ 2000-007900

(51) Int. Cl.[7] .............................................. B29D 11/00
(52) U.S. Cl. ...................... 264/1.1; 264/1.38; 264/2.5; 425/808; 249/115; 249/134; 249/135
(58) Field of Search .............................. 249/114.1, 115, 249/134, 135; 425/808; 264/2.5, 1.1, 1.38, 1.7

(56) References Cited

U.S. PATENT DOCUMENTS 5,271,875 A * 12/1993 Appleton et al. ........... 249/160
5,524,419 A   6/1996 Shannon
6,315,929 B1 * 11/2001 Ishihara et al. .......... 249/114.1

FOREIGN PATENT DOCUMENTS

| JP | 63-36484   | 7/1988 |
| JP | 3-1125     | 1/1991 |
| JP | 10-109316  | 4/1998 |

\* cited by examiner

Primary Examiner—Robert Davis
Assistant Examiner—Donald Heckenberg
(74) Attorney, Agent, or Firm—Burr & Brown

(57) ABSTRACT

A mold assembly for forming an ophthalmic lens, or a lens blank from which one ophthalmic lens is produced by effecting a cutting operation on at least one of a front surface and a back surface of the lens blank, the mold assembly consisting of a first mold having a molding surface and a second mold having a molding surface, which first and second molds are assembled together so as to define therebetween a mold cavity having a profile corresponding to that of the ophthalmic lens or the lens blank, the mold cavity being filled with a polymeric material which is polymerized to form the ophthalmic lens or the lens blank, wherein at least one of the first and second molds is a layered mold which is constituted by a composite sheet comprising a metal sheet layer and at least one resin layer which are laminated on each other, the at least one resin layer of the composite sheet providing the molding surface of the layered mold which partially defines the mold cavity.

10 Claims, 5 Drawing Sheets

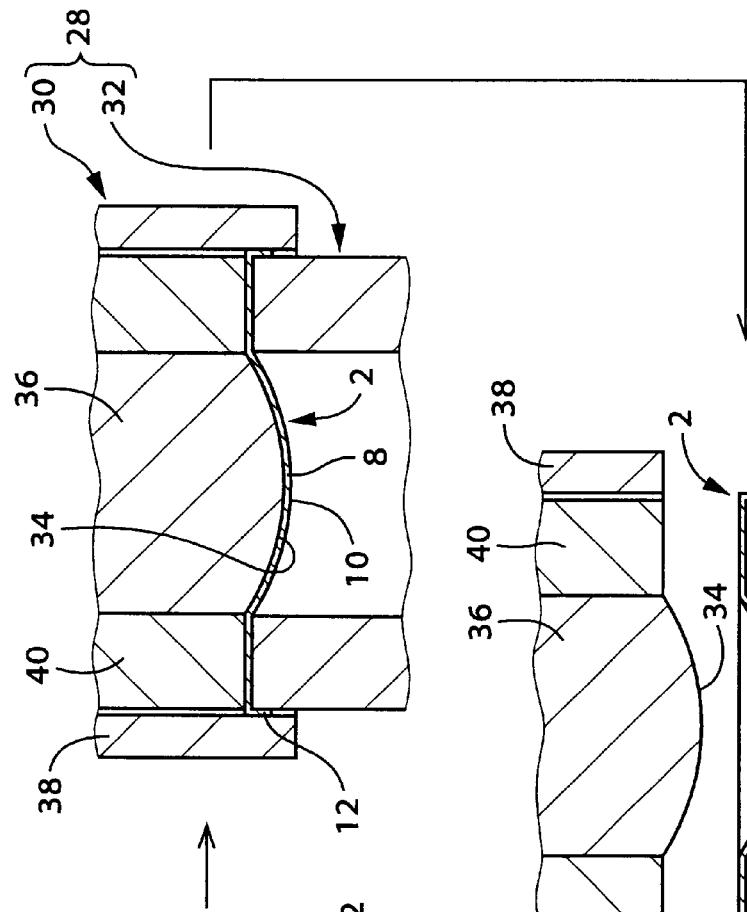
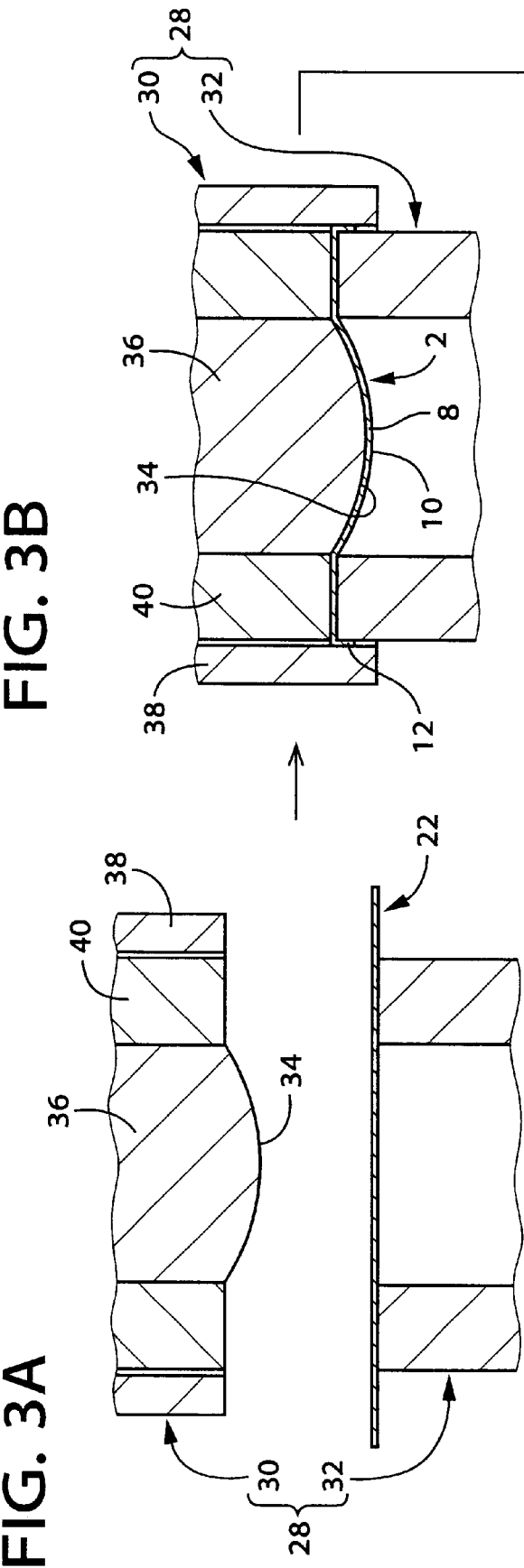
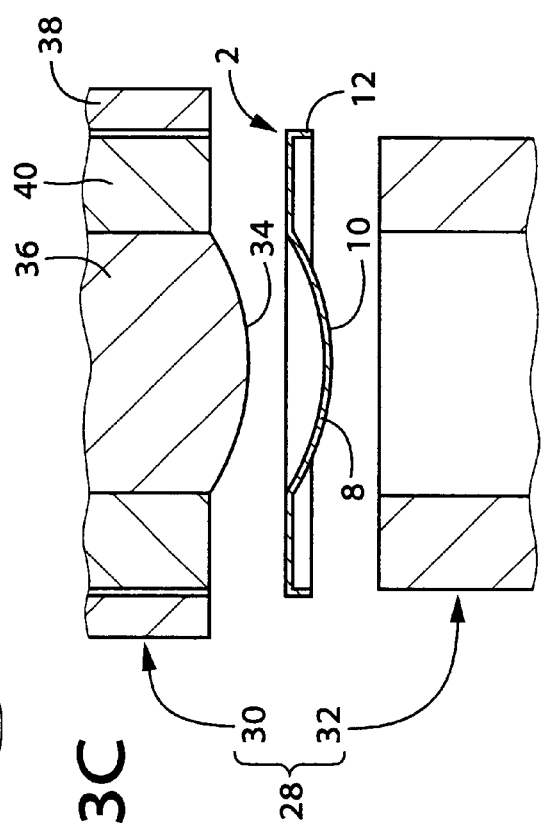
FIG. 3A
FIG. 3B
FIG. 3C

MOLD ASSEMBLY FOR FORMING OPHTHALMIC LENS OR LENS BLANK AND METHOD OF PRODUCING THE SAME USING THE MOLD ASSEMBLY

This application is based on Japanese Patent Application No. 2000-007900 filed Jan. 17, 2000, the contents of which are incorporated hereinto by reference.

BACKGROUND OF THE INVENTION

1. Field of the Invention

The present invention relates to a mold assembly for forming an ophthalmic lens or a lens blank, and a method of producing the same using the mold assembly. More particularly, the present invention is concerned with such a mold assembly which is suitably used for forming the ophthalmic lens such as a contact lens or an intraocular lens, or the lens blank from which one ophthalmic lens is produced by effecting a cutting operation on at least one of front and back surfaces of the lens blank, the mold assembly having a structure which assures a high degree of forming accuracy and which is economical to manufacture with relatively inexpensive equipment. The present invention is also concerned with a method of forming the ophthalmic lens or lens blank using the mold assembly, at a reduced cost while assuring a high degree of configurational accuracy of the ophthalmic lens or lens blank to be obtained.

2. Discussion of Related Art

There are proposed various techniques for producing an ophthalmic lens such as a contact lens or an intraocular lens, or a lens blank from which one ophthalmic lens is produced by effecting a cutting operation on at least one of its front and back surfaces, by using a mold assembly consisting of a first mold and a second mold in the form of a male mold and a female mold, or an upper mold and a lower mold. The first and second molds are assembled together to define therebetween a mold cavity having a configuration corresponding to that of the ophthalmic lens or the lens blank. The mold cavity defined when the first and second molds are closed together is filled with a suitable polymeric material to mold the intended ophthalmic lens or lens blank therein.

JP-B-63-36484 and JP-B-3-1125 disclose a method of producing a contact lens by a molding operation, comprising the steps of assembling male and female molds together so as to define a mold cavity therebetween, introducing a polymeric material into the mold cavity, and polymerizing the polymeric material, to thereby provide the contact lens having an intended configuration. In the proposed method, the male and female molds are formed of a resin material rather than a metallic material, for assuring easy removal of the molded contact lens from the molds, and efficient and economical forming of the molds. The male and female molds formed of the resin material undesirably have deteriorated configurational accuracy due to dimensional errors which arise from the shrinkage of the resin material during forming of the resin molds. In this case, the contact lens obtained by using those molds may not have an accurately formed lens surface whose optical portion has an intended optical power. Like ordinary resin products or articles, the resin-made male and female molds are generally produced by high-pressure molding such as injection molding, using metallic dies. The metallic dies used in the high-pressure molding need to have a high degree of mechanical strength, and maintain the original surface condition which is sufficient to provide molding surfaces of the male and female molds with high accuracy of configuration, since the molding surfaces of the molds give the opposite surfaces of the contact lens to be obtained. Such high-pressure molding, however, undesirably and inevitably requires expensive equipment. In addition, the molds are likely to be deformed upon removal or releasing of the molded contact lens therefrom, making it difficult to repeatedly use the molds in subsequent molding operations.

JP-A-10-109316 discloses a mold assembly for forming a contact lens, which assures easy removal of the molded contact lens from a male or a female mold. Described in detail, one of the male and female molds of the mold assembly disclosed in the publication is formed of a metallic material. In the metal mold, the molding surface which gives one of opposite surfaces of the intended contact lens is covered with a release layer which permits the molded contact lens to be easily removed therefrom. When the contact lens is formed by using the mold assembly constructed as described above, the molded contact lens has improved accuracy of surface configuration since the metal mold has dimensional accuracy which is more stable than the resin mold, and assures a sufficiently high degree of hardness for avoiding deformation of the mold and preventing scoring of the mold upon removal of the molded contact lens therefrom. Moreover, the arrangement disclosed in the publication permits the metal mold to be repeatedly used in subsequent molding operations. The above-described mold assembly, however, does not solve the problems of low efficiency and economy of manufacture of such a metal mold.

U.S. Pat. No. 5,524,419 discloses a method and an apparatus for forming a contact lens by a molding operation, wherein a first and a second web each having a suitable width are continuously fed and subjected to a vacuum forming operation for forming a succession of male molds in the form of posterior mold cavities in the first web, and a succession of female molds in the form of anterior mold cavities in the second web. These posterior and anterior mold cavities are formed in the first and second webs, respectively, such that the mold cavities are spaced apart from each other in the longitudinal direction of the first and second webs with a predetermined interval therebetween. After a predetermined amount of a curable lens material is introduced into each anterior mold cavity (as the female mold), the first and second webs are superposed on each other to close the male and female molds together. Thereafter, the lens material in the mold cavities between the male and female molds is polymerized by exposure to a light, to thereby form the intended contact lens in each mold cavity. Subsequently, the first and second webs are separated from each other, and the contact lenses molded in the mold cavities are taken out of the mold cavities.

In forming the male and female molds in the respective first and second webs by the vacuum forming operation which is effected at a lower pressure than in the injection molding, the thickness of the webs in which the male and female molds are to be formed needs to be made small to a certain extent in view of the formability of the male and female molds. If the thickness of the webs is relatively small, the male and female molds formed in the thin webs undesirably tend to be deformed during the molding operation for forming the contact lens. In this case, the contact lens molded in the deformed male and female molds may not have the intended optical characteristics with high accuracy.

SUMMARY OF THE INVENTION

It is therefore a first object of the present invention to provide a mold assembly which permits economical manufacture of an ophthalmic lens which exhibits intended optical characteristics with high accuracy, or a lens blank which gives such an ophthalmic lens, while permitting a repeated use of its components.

It is a second object of the invention to provide a method of forming an intended ophthalmic lens or a lens blank using the mold assembly.

The above-indicated first object of the present invention may be attained according to a first aspect of the invention, which provides a mold assembly for forming an ophthalmic lens, or a lens blank from which one ophthalmic lens is produced by effecting a cutting operation on at least one of a front surface and a back surface of the lens blank, the mold assembly consisting of a first mold having a molding surface and a second mold having a molding surface, which first and second molds are assembled together so as to define therebetween a mold cavity having a profile corresponding to that of the ophthalmic lens or the lens blank, the mold cavity being filled with a polymeric material which is polymerized to form the ophthalmic lens or the lens blank, wherein at least one of the first and second molds is a layered mold which is constituted by a composite sheet comprising a metal sheet layer and at least one resin layer which are laminated on each other, the at least one resin layer of the composite sheet providing the molding surface of the layered mold which partially defines the mold cavity.

In the present mold assembly wherein at least one of the first and second molds is a layered mold constituted by a composite sheet in which the metal sheet layer and at least one resin layer are superposed on each other, the layered mold does not suffer from a problem of deteriorated configurational accuracy due to dimensional errors which arise from a shrinkage of a resin material during forming of the conventional resin-made mold. Accordingly, the layered mold which is constituted by each of the at least one of the first and second molds has stable configurational accuracy, so that one of the opposite surfaces of the ophthalmic lens or the lens blank, which is formed by the layered mold and in which the optical potion having an intended optical power is formed, has a high degree of configurational accuracy. The layered mold according to the present invention can be easily formed by effecting a low-pressure press forming or vacuum forming operation on the composite sheet, for instance. Accordingly, the present layered mold can be efficiently and economically formed than the conventional metal mold or the release layer-covered metal mold. In addition, the present layered mold can be formed without requiring expensive equipment as used in forming the conventional resin mold by the high-pressure molding such as injection molding.

In the present layered mold whose molding surface is provided by the resin layer of the composite sheet, the molded ophthalmic lens or lens blank can be easily removed or released from the layered mold which is constituted by each of the at least one of the first and second molds. According to this arrangement, the scoring of the molding surface of the layered mold is prevented when the molded ophthalmic lens or the lens blank is removed therefrom. The presence of the metal sheet layer which is laminated integrally with the resin layer is effective to prevent the layered mold from being deformed upon removal of the molded ophthalmic lens or the lens blank therefrom.

Accordingly, the present mold assembly constructed as described above permits economical production of the ophthalmic lens or the lens blank to which the intended optical characteristics are given with high accuracy. Moreover, the layered mold constituted by each of the at least one of the first and second molds can be repeatedly used in subsequent molding operations.

As described above, the layered mold which consists of each of the at least one of the first and second molds has stable configurational accuracy. When the lens blank formed in the present mold assembly is subjected to a cutting operation on one of its front and back surfaces to form the intended lens surface, the lens blank can be sucked and held with high stability at the other surface by a vacuum chuck having a suction surface whose configuration follows that of the other surface of the lens blank. Accordingly, the cutting operation on the above-indicated one surface of the lens blank can be effected with high stability.

In one preferred form of the above first aspect of the present invention, the composite sheet has a thickness of not smaller than 0.06 mm. The metal sheet layer and the resin layer of the composite sheet preferably have thickness values in a range of 0.05~0.3 mm and in a range of 0.01~0.2 mm, respectively. This arrangement permits efficient and economical formation of the layered mold and prevents undesirable deformation of the layered mold upon polymerization of the polymeric material for forming the ophthalmic lens or the lens blank.

In another preferred form of the above first aspect of the present invention, the layered mold is formed by a press forming operation on the composite sheet. According to this arrangement, the layered mold having a configuration which follows that of a press forming surface of a die of a press can be formed with a high degree of configurational accuracy. Therefore, one of the opposite surfaces of the ophthalmic lens or the lens blank, which is formed by the layered mold and in which the optical portion having an intended optical power is formed, can be formed with high accuracy, so that the ophthalmic lens to be obtained is capable of exhibiting the intended optical characteristics. Further, in the subsequent cutting operation on the lens blank, the lens blank can be sucked and held at one of its opposite surfaces which is given by the layered mold, by the vacuum chuck whose suction surface has a configuration following that of the above-indicated one surface of the lens blank.

In still another preferred form of the above first aspect of the invention, the polymeric material in the mold cavity is thermal-polymerized. According to the present arrangement, the polymeric material is polymerized by utilizing a relatively inexpensive heat source such as a heater, whereby the molding operation for forming the ophthalmic lens or the lens blank can be effected at a relatively low cost.

In yet another preferred form of the above first aspect of the invention, the molding surface of the layered mold which provides each of the at least one of the first and second molds, functions as a lens-forming surface which gives a lens surface in which an optical portion of the ophthalmic lens or the lens blank is formed. This arrangement enables the molded ophthalmic lens or the lens blank to have the intended optical characteristics with high accuracy.

In a further preferred form of the above first aspect of the invention, the at least one resin layer comprises a pair of resin layers laminated on opposite surfaces of the metal sheet layer.

In the present composite sheet wherein the metal sheet layer is sandwiched between the resin layers, the opposite surfaces of the composite sheet are provided by the resin layers. Accordingly, in the layered mold formed of the thus constructed composite sheet, the molding surface partially defining the mold cavity is always constituted by either one of the resin layers which sandwich the metal sheet layer therebetween. Unlike the composite sheet wherein only its one of opposite surfaces is provided by the resin layer, the composite sheet of the present arrangement can be readily and easily formed into the layered mold without exercising an utmost care in orientation of the composite sheet in forming the layered mold, resulting in an efficient manufacture of the layered mold.

In a still further preferred form of the above first aspect of the invention, the composite sheet which constitutes the layered mold further comprises an adhesive layer which is interposed between the metal sheet layer and each of the at least one resin layer, for bonding the metal sheet layer and the at least one resin layer together.

The composite sheet wherein the metal sheet layer and the resin layer are firmly bonded together owing to the adhesive layer interposed therebetween can be formed into the layered mold with high efficiency. Further, the present arrangement is effective to prevent the metal sheet layer and the resin layer of the composite sheet from separating away from each other upon molding of the ophthalmic lens or the lens blank, or upon removal of the molded ophthalmic lens or the lens blank from the molding surface of the layered mold constituted by the composite sheet.

The above-indicated second object of the present invention may be attained according to a second aspect of the invention, which provides a method of forming an ophthalmic lens or a lens blank, by using the mold assembly as defined in the above-indicated first aspect of the invention, the method comprising the steps of: assembling the first and second molds together to define the mold cavity therebetween, at least one of the first and second molds being the layered mold whose molding surface partially defining the mold cavity is provided by the at least one resin layer of the composite sheet; polymerizing the polymeric material which fills the mold cavity, to form the ophthalmic lens or the lens blank; separating the first and second molds away from each other; and removing the ophthalmic lens or the lens blank from the first and second molds.

The present method using the mold assembly having the advantages described above permits easy and economical formation of the ophthalmic lens whose optical surface has a high degree of configurational accuracy and which exhibits the intended optical characteristics, or the lens blank that gives such an ophthalmic lens. Since the layered mold of the mold assembly used in the present method can be repeatedly used, the cost for manufacture of the mold assembly is effectively reduced, and the cost for forming the ophthalmic lens or the lens blank is accordingly reduced.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIGS. 1A and 1B are elevational views in cross section showing a mold assembly including a male mold and a female mold, which mold assembly is constructed according to one embodiment of the present invention, wherein FIG. 1A is a view showing the mold assembly before the two molds are closed together, while FIG. 1B is a view showing the mold assembly when the two molds are closed together;

FIGS. 3A–3C are views showing process steps for producing the male mold of FIGS. 1A and 1B, wherein FIG. 3A shows a press in which the composite sheet of FIG. 2 is fed between an upper and a lower die of the press, FIG. 3B shows the composite sheet which is subjected to a press forming operation, and FIG. 3C shows the formed male mold which has been unloaded from the upper and lower dies of the press;

FIGS. 4A–4C are views showing process steps for producing the female mold of FIGS. 1A and 1B, wherein FIG. 4A shows a press in which the composite sheet of FIG. 2 is fed between an upper and a lower die of the press, FIG. 4B shows the composite sheet which is subjected to a press forming operation, and FIG. 3C shows the formed female mold which has been unloaded from the upper and lower dies of the press; and FIGS. 5A–5D are views showing process steps for producing a contact lens according to the present invention by using the mold assembly of FIGS. 1A and 1B, wherein FIG. 5A shows the female mold which accommodates a polymeric material in its recess, FIG. 5B shows the assembled male and female molds of the mold assembly whose mold cavity is filled with the polymeric material, FIG. 5C shows a molding operation to form the contact lens by thermal-polymerization of the polymeric material in the mold cavity, and FIG. 5D shows the molded contact lens which has been removed from the male and female molds.

DETAILED DESCRIPTION OF PREFERRED EMBODIMENT

Figure 1A:
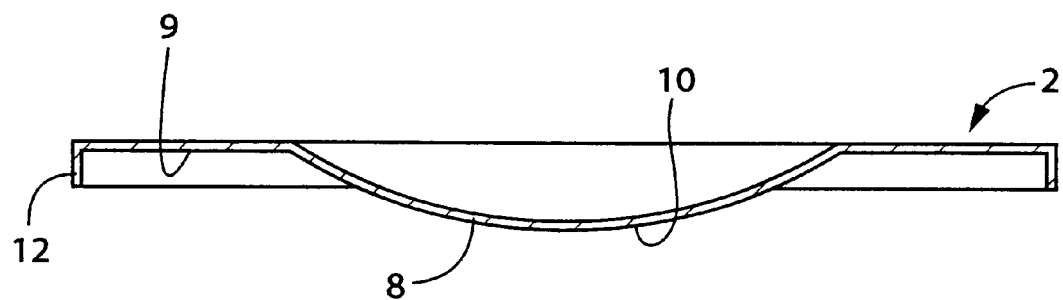
Figure 1B:
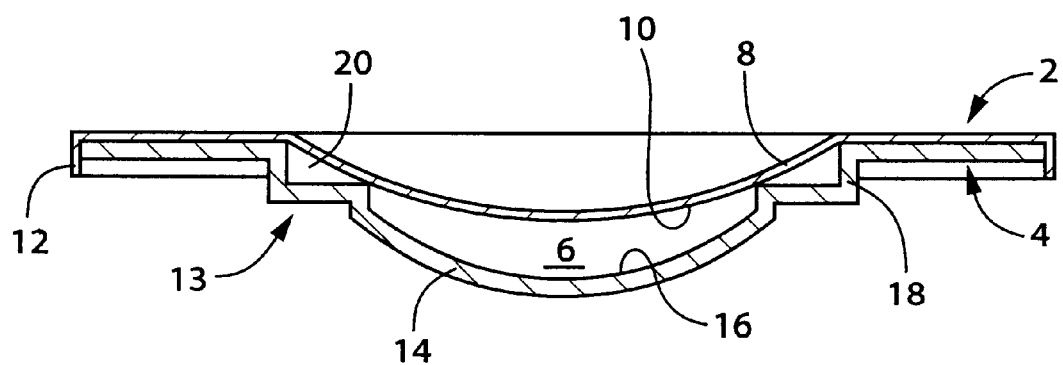

Referring first to FIGS. 1A and 1B, there is shown a mold assembly for forming an ophthalmic lens or a lens blank, which mold assembly is constructed according to one embodiment of the present invention. The mold assembly shown FIGS. 1A and 1B consists of a first mold in the form of a male mold 2 and a second mold in the form of a female mold 4. As shown in FIG. 1B, the male and female molds 2, 4 are assembled together to define therebetween a mold cavity 6 whose profile follows that of an intended ophthalmic lens, e.g., a contact lens in this embodiment.

The male mold 2 is a generally disc-shaped member, and has a protruding portion 8 which protrudes downwardly from its central portion as seen in FIG. 1A and which has a curved convex configuration. A central portion of the lower surface of the protruding portion 8 serves as a molding surface 10 (lens-forming surface) for forming a back surface (i.e., base curved surface) of the intended contact lens. The base curve-molding surface 10 of the male mold 2 has a configuration accurately following that of the back surface of the contact lens in which an optical portion is formed. The male mold 2 further includes a circumferential flange 12 which is formed at its outer peripheral portion over an entire circumference thereof, so as to extend therefrom downwardly in the direction of protrusion of is the protruding portion 8 by a suitable axial distance.

The female mold 4 is a generally disc-shaped member and has a protruding portion 13 which protrudes downwardly from its central portion as seen in FIG. 1. A central portion of the protruding portion 13 of the female mold 4 defines a recessed portion 14 whose inner surface functions as a molding surface 16 (lens-forming surface) for forming a front surface (i.e., front curved surface) of the contact lens. The front curve-molding surface 16 of the female mold 4 has a configuration accurately following that of the front surface of the contact lens in which an optical portion is formed. The protruding portion 13 of the female mold 4 has a stepped cylindrical portion formed radially outwardly of the central recessed portion 14. The stepped cylindrical portion has a larger diameter at its radially outer portion than the radially inner portion, so as to provide a large-diameter portion 18 at its open end.

The thus constructed male and female molds 2, 4 are assembled together such that the protruding portion 8 of the male mold 2 covers the recessed portion 14 of the female mold 4, and such that an annular mating surface 9 of the male mold 2 located radially outwardly of the protruding portion 8 and an annular mating surface 15 of the female mold 4 located radially outwardly of the protruding portion 13 of the female mold 4 are held in closely abutting contact with each other, whereby the mold cavity 6 is defined by and between the base curve-molding surface 10 of the male mold 2 and the front curve-molding surface 16 of the female mold 4, as shown in FIG. 1B. When the male and female molds 2, 4 are assembled together as described above, a storage portion 20 for storing an excess polymeric material during a molding operation of the contact lens is defined by and between the radially outer portion of the protruding portion 8 of the male mold 2 and the large-diameter portion 18 of the stepped cylindrical portion of the protruding portion 13 of the female mold 4. The male and female molds 2, 4 are assembled together such that the female mold 4 is fitted into and held in engagement with the circumferential flange 12 of the male mold 2. According to this arrangement, the centers of the molding surfaces 10, 16 of the male and female molds 2, 4 are easily and properly aligned with each other. Further, the mating surfaces 9, 15 of the male mold 2 and the female mold 4 are held in abutting contact with each other upon assembling of the male and female molds 2, 4, for thereby increasing fluid tightness therebetween so as to prevent entry of the air (oxygen, in particular) into the mold cavity 6.

Figure 2:
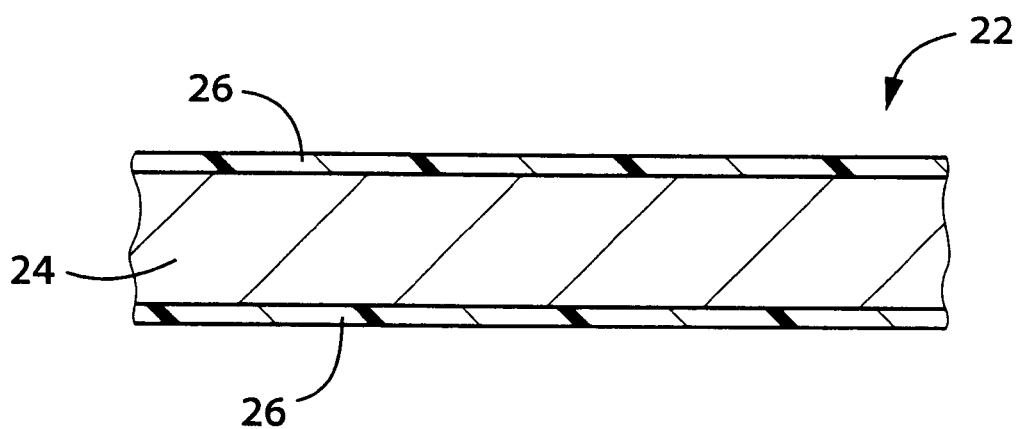
FIG. 2 is a fragmentary enlarged view in cross section showing the composite sheet which constitutes the two molds of the mold assembly of FIGS. 1A and 1B.

In the present embodiment, both of the male and female molds 2, 4 are formed of a composite sheet 22 as shown in FIG. 2. The composite sheet 22 has a laminar structure wherein a metal sheet layer 24 is interposed between a pair of resin layers 26, 26. The three layers 24, 26, 26 are superposed on one another such that the resin layer 26 is welded at its inner surface to the corresponding surface of the metal sheet layer 24. Accordingly, the laminar structure of the composite sheet 22 includes the metal sheet layer 24 as a core layer, and two resin layers 26, 26 as surface layers. Two pieces of the thus constructed composite sheet 22 are formed into the respective male and female molds shown in FIGS. 1A and 1B.

In the present embodiment, each of the male and female molds 2, 4 formed of the composite sheet 22 constructed as described above is a layered mold wherein each of the molding surfaces 10, 16 defining the mold cavity 6 for the intended contact lens is provided by the resin layer 26.

The layered male and female molds 2, 4 formed of the composite sheet 22 wherein the metal sheet layer 24 as the core layer is interposed between the resin layers 26, 26, do not suffer from undesirable deterioration of configurational accuracy due to shrinkage of the resin material during forming of the conventional resin mold. Unlike the conventional resin mold, the layered male and female molds 2, 4 are capable of exhibiting high degrees of rigidity and strength enough to prevent deformation thereof during molding of the contact lens in the mold cavity 6 and upon removal of the molded contact lens therefrom. In addition, the layered male and female molds 2, 4 can be easily formed by the low-pressure press forming or vacuum forming operation, for instance. In the present embodiment, the metal sheet layer 24 of the composite sheet 22 for constituting the female mold 4 has a thickness value which is larger than that of the metal sheet layer 24 of the composite sheet 22 for constituting the male mold 4, so that the thickness of the composite sheet 22 for the female mold 4 is made larger as a whole than that of the composite sheet 22 for the male mold 2. Accordingly, the female mold 4 has higher degrees of rigidity and strength than the male mold 2. Since the base curve-molding surface 10 of the male mold 2 and the front curve-molding surface 16 of the female mold 4 are provided by the respective resin layers 26 of the respective composite sheets 22, the molded contact lens can be easily removed from the molding surfaces 10, 16 of the male and female molds 2, 4.

The metal sheet layer 24 of the composite sheet 22 which constitutes the layered male and female molds 2, 4 gives sufficiently high degrees of rigidity and strength to the male and female molds 2, 4, and permits the male and female molds 2, 4 to be formed by the low-pressure molding. In view of this, the metal sheet layer 24 is preferably formed of a material which assures easy formation of the male and female molds 2, 4. For instance, the metal sheet layer 24 is formed of a metallic material such as aluminum, copper, gold or silver, and an alloy thereof. In particular, inexpensive aluminum or its alloy is preferably used for the metal sheet layer 24.

The resin layer 26 of the composite sheet 22 provides the base curve-molding surface 10 of the male mold 2 for giving the base curved surface of the intended contact lens, and the front curve-molding surface 16 of the female mold 4 for giving the front curved surface of the contact lens. The resin layer 26 is required to assure easy removal of the molded contact lens from the male and female molds 2, 4. In view of this, the resin layer 26 is formed of a resin material which permits the resin layer 26 to maintain its nominal surface condition without being adversely influenced by a contact with the polymeric material for the contact lens and the molding condition for forming the contact lens, and which has a relatively small adhesive strength with respect to the molded contact lens. Examples of such a resin material include polypropylene, polyethylene, polyethylene terephthalate, polystyrene, polycarbonate, polyvinyl chloride, polyamide, polyacetal, and fluoro resin. In particular, the polypropylene is preferably used for the resin layer 26 in view of formability and production efficiency.

Although the thickness of each layer and the overall thickness of the composite sheet 22 consisting of the metal sheet layer 24 and the resin layers 26 are not particularly limited, it is preferable that the thickness of the metal sheet layer 24 is in a range of 0.05~0.3 mm. If the thickness of the metal sheet layer 24 is excessively small, the metal sheet layer 24 undesirably tends to be torn, deteriorating its handling, and accordingly deteriorating working efficiency in bonding with the resin layers 26 and forming the composite sheet 22. On the other hand, the excessively large thickness of the metal sheet layer 24 inevitably pushes up the cost of manufacture of the composite sheet 22, and deteriorates production efficiency of the male and female molds 2, 4 by the low-pressure forming operation on the composite sheet 22. Further, if the thickness of the metal sheet layer 24 is larger than 0.3 mm, the male and female molds 2, 4 formed of the composite sheet 22 have a higher degree of rigidity than required. In this case, the male and female molds 2, 4 are not likely to be deformed or collapsed, making it difficult to remove the molded contact lens therefrom.

The resin layers 26 preferably have a thickness value in a range of 0.01~0.2 mm. If the thickness of each resin layer 26 is excessively small, the resin layer 26 has an undesirably low degree of smoothness, deteriorating the surface conditions of the base curve-molding surface 10 of the male mold 2 and the front curve-molding surface 16 of the female mold 4, which molding surfaces 10, 16 are provided by the respective resin layers 26. The excessively large thickness of the resin layers 26 results in a poor bonding with the metal sheet layer 24, so that the resin layers 26 are likely to be separated away from the metal sheet layer 24 during the molding of the contact lens, rendering the molding operation of the intended contact lens difficult. While the two resin layers 26, 26 are laminated on the opposite surfaces of the metal sheet layer 24 in the present embodiment, only one resin layer 26 may be laminated on one of the opposite surfaces of the metal sheet layer 24.

In view of the above, the overall thickness of the composite sheet 22 is preferably at least 0.06 mm. This preferable thickness value of the composite sheet 22, i.e., at least 0.06 mm, equals a sum of the respective lower limit values of the thickness of the metal sheet layer 24 and the resin layer 26, i.e., 0.05 mm and 0.01 mm. Accordingly, the composite sheet 22 having the preferable thickness value described above does not suffer from the problems which arise from excessively thin metal sheet layer 24 and resin layer 26. The thickness of the composite sheet 22 is determined depending upon the respective thickness values of the metal sheet layer 24 and the resin layer 26 and the number of the metal sheet layer 24 and the resin layer or layers 26. While the upper limit value of the thickness of the composite sheet 22 is not particularly limited, it is preferable to determine the upper limit value of the thickness of the composite sheet 22 such that the composite sheet 22 assures easy forming of the male and female molds 2, 4.

There will be explained process steps for forming the layered male and female molds 2, 4, by using the composite sheet 22 constructed as described above.

FIGS. 3A–3C schematically indicate process steps for producing the layered male mold 2. Referring first to FIG. 3A, the composite sheet 22 which has been cut into a predetermined size is fed into a press 28 such that the composite sheet 22 is interposed between an upper die 30 and a lower die 32 of the press 28. The upper die 30 includes an inner punch 36, an outer punch 38, and a sheet holder 40 interposed therebetween. The inner punch 36 has an end face which has a curved convex configuration following the configuration of the inner surface of the protruding portion 8 of the male mold 2. A central portion of the end face of the inner punch 36 functions as a press forming surface 34 whose configuration follows that of the base curved surface of the contact lens to be molded between the male and female molds 2, 4. The outer punch 38 is coaxially fitted onto the inner punch 36 via the sheet holder 40.

The upper and lower dies 30, 32 of the press 28 are closed together for effecting a press forming operation on the composite sheet 22 interposed therebetween, as shown in FIG. 3B. As a result of the press forming operation on the composite sheet 22 which is held by and between the seat holder 40 of the upper die 30 and the lower die 32, the protruding portion 8 having a configuration corresponding to that of the press forming surface 34 of the inner punch 36 is formed by the inner punch 36 of the upper die 30 at a central portion of the composite sheet 22, and the downwardly extending circumferential flange 12 is formed by the outer punch 38 of the upper die 30 at an outer peripheral portion of the composite sheet 22. Thus, the layered male mold 2 is obtained, which has the protruding portion 8 having the base curve-molding surface 10 which gives the base curved surface of the contact lens, and the flange 12 which functions aligning means for properly aligning the centers of the male and female molds 2, 4 with each other for defining the mold cavity 6 therebetween.

The composite sheet 22 is easily formed into the intended male mold 2 by the low-pressure press forming operation. For instance, the press forming operation on the composite sheet 22 can be effected at a relative low pressure, e.g., at a pressure of not lower than $9.80665 \times 10^4$ Pa, more preferably at a pressure in a range of about $9.80665 \times 10^4$~$9.80665 \times 10^6$ Pa. Accordingly, the press forming operation can be effected by using a relatively inexpensive press, such as a pneumatically operated press. Further, as the upper die 30 including the inner and outer punches 36, 38, and the lower die 32, it is possible to use those having a relatively low mechanical strength. In effecting the press forming operation on the composite sheet 22 for forming the male mold 2, it is preferable to heat the upper and lower dies 30, 32 of the press 28 at a suitable temperature, for improved formability of the composite sheet 22.

Thereafter, the upper and lower dies 30, 32 of the press 28 are separated away from each other to unload the formed male mold 2 therefrom, as shown in FIG. 3C.

Figure 4A:
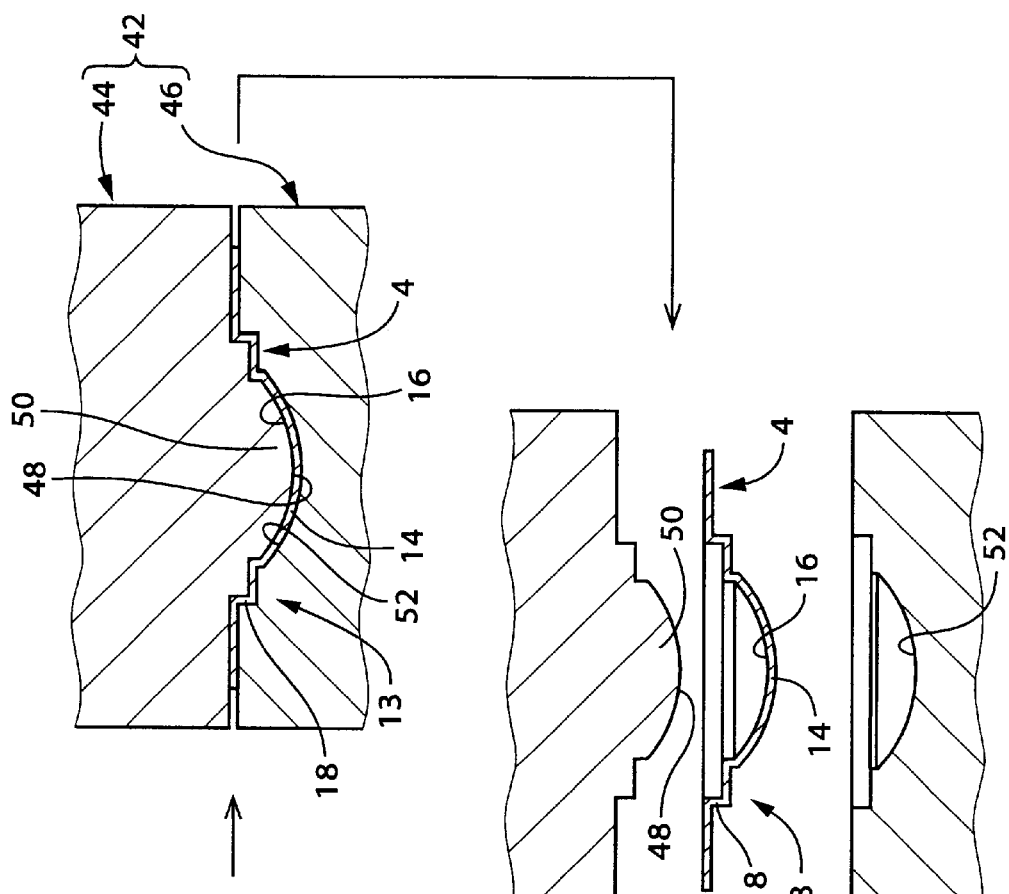
Figure 4B:
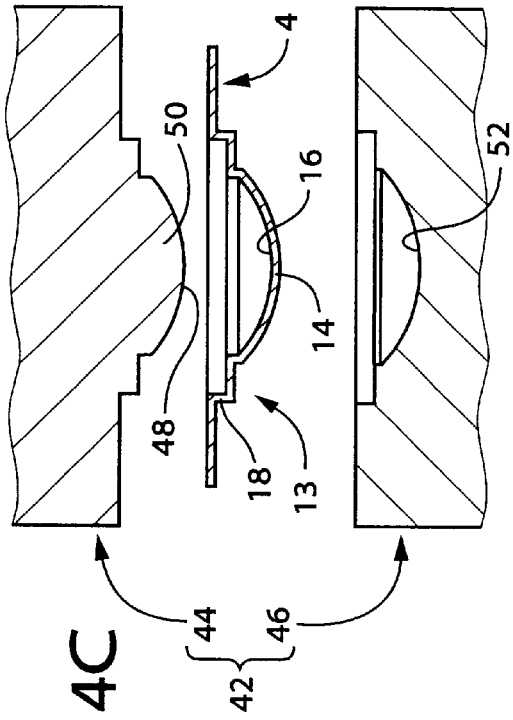
Figure 4C:
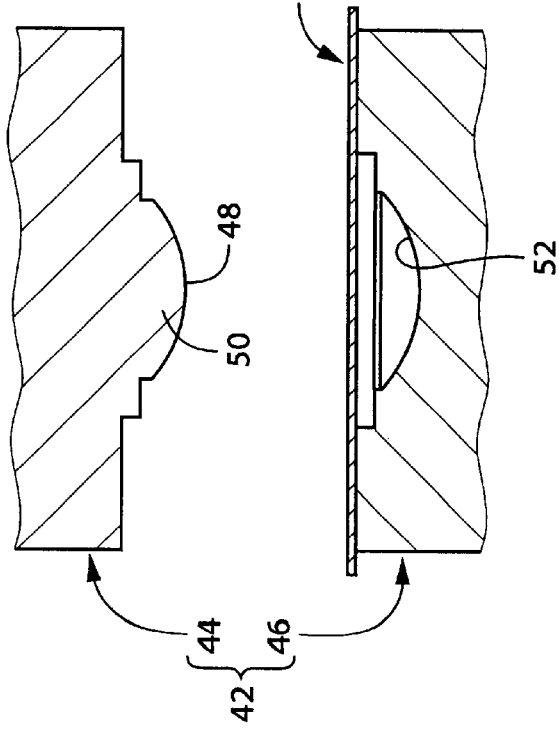

FIGS. 4A–4C schematically indicate process steps for producing the layered female mold 4. Referring first to FIG. 4A, the composite sheet 22 which has been cut into a predetermined size is fed into a press 42 such that the composite sheet 22 is interposed between an upper die 44 and a lower die 46 of the press 42, which upper and lower dies 44, 46 are different from the upper and lower dies 30, 32 of the press 28 used for forming the male mold 2. The lower surface of the upper die 44 has a generally convex configuration following that of the inner surface of the recessed portion 14 of the female mold 4. Described in detail, at a central portion of the lower surface of the upper die 44, there is formed a protuberance 50 having a press forming surface 48 whose configuration follows that of the front curved surface of the contact lens to be molded between the male and female molds 2, 4. The lower die 46 has a recess 52 formed at a central portion of its upper surface and having a configuration which gives the outer surface of the recessed portion 14 of the female mold 4.

The upper and lower dies 44, 46 of the press 42 are closed together for effecting a press forming operation on the composite sheet 22 interposed therebetween, as shown in FIG. 4B. As a result of the press forming operation on the composite sheet 22 which is held by and between the upper and lower dies 44, 46, the downwardly recessed portion 14 is formed at a central portion of the composite sheet 22 between the protuberance 50 of the upper die 44 and the recess 52 of the lower die 46. The inner surface of the recessed portion 14 has a configuration following that of the press forming surface 48 of the protuberance 50 of the upper die 44. Thus, the layered female mold 4 is formed, which has the recessed portion 14 having the front curve-molding surface 16 which gives the front curved surface of the intended contact lens.

The composite sheet 22 is easily formed into the intended female mold 4 by the low-pressure press forming operation. For instance, the press forming operation on the composite sheet 22 can be effected at a relative low pressure, e.g., at a pressure of not lower than $9.80665 \times 10^4$ Pa, preferably at a pressure in a range of about $9.80665 \times 10^4$~$9.80665 \times 10^6$ Pa. Accordingly, the press forming operation can be effected by using a relatively inexpensive press, such as a pneumatically operated press. Further, as the upper die 44 and the lower die 46, it is possible to use those having a relatively low mechanical strength. In effecting the press forming operation on the composite sheet 22 for forming the female mold 4, it is preferable to heat the upper and lower dies 44, 46 of the press 42 at a suitable temperature for improved formability of the composite sheet 22.

Thereafter, the upper and lower dies 44, 46 of the press 42 are separated away from each other to unload the formed female mold 4 therefrom.

In the present embodiment, a piece of the composite sheet having a predetermined size to form a single male or female mold 2, 4 is subjected to the press forming operation described above, for thereby forming a single male or female mold 2, 4. The composite sheet 22 having a suitable width may be continuously fed into the press and subjected to the press forming operation in its longitudinal direction, so that a plurality of male and female molds 2, 4 are successively formed from a single composite sheet 22.

As needed, one of the male and female molds 2, 4 may be configured such that the corresponding one of the base curve-molding surface 10 and the front curve-molding surface 16 holds thereon the molded contact lens when the male and female molds 2, 4 are separated away from each other as described below. According to this arrangement, the molded contact lens can be easily removed from the mold assembly consisting of the male and female molds 2, 4.

While the male and female molds 2, 4 are formed by the press forming operation on the composite sheet 22, the male and female molds 2, 4 may be formed by a vacuum forming operation on the composite sheet 22.

Referring next to FIGS. 5A–5D, there will be explained a process of manufacturing the contact lens by using the mold assembly consisting of the layered male and female molds 2, 4 constructed as described above.

Figure 5A:
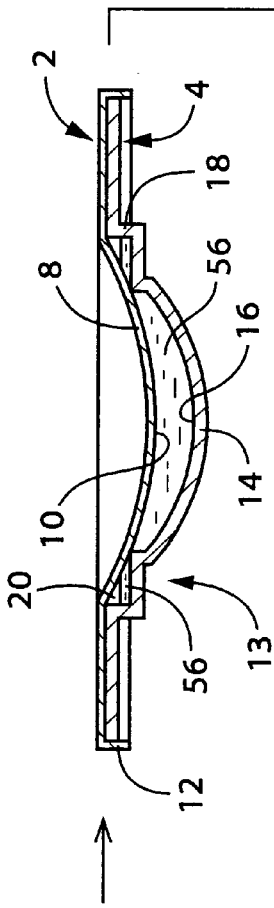
Figure 5B:
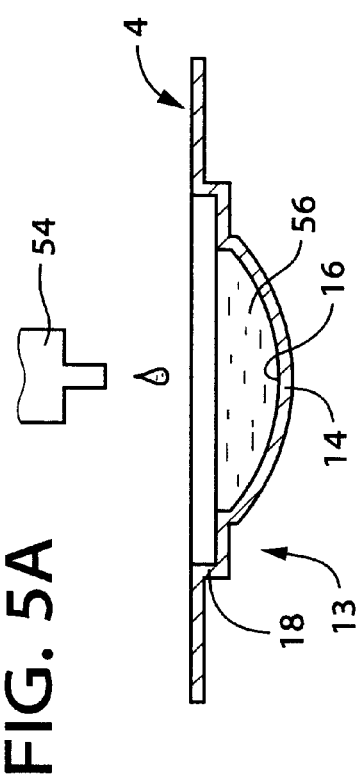

Initially, a polymeric material 56 which gives a polymer of the intended contact lens is supplied from a suitable supply device 54 into the recessed portion 14 of the female mold 4, as shown in FIG. 5A. Next, the male mold 2 is assembled with the female mold 4 to define the mold cavity (6) which is filled with the polymeric material 56, as shown in FIG. 5B. The male and female molds 2, 4 are assembled together such that the female mold 4 is fitted into and held in engagement with the circumferential flange 12 of the male mold 2, for easy alignment of the centers of the two molds 2, 4 with each other. When the male and female molds 2, 4 are assembled together, the mating surfaces 9, 15 of the two molds 2, 4 are held in closely abutting contact with each other, for thereby preventing entry of the air into the mold cavity (6). An excess polymeric material 56 which overflows the mold cavity (6) upon assembling of the two molds 2, 4 is stored in the storage portion 20 located above the mold cavity (6).

Figure 5C:
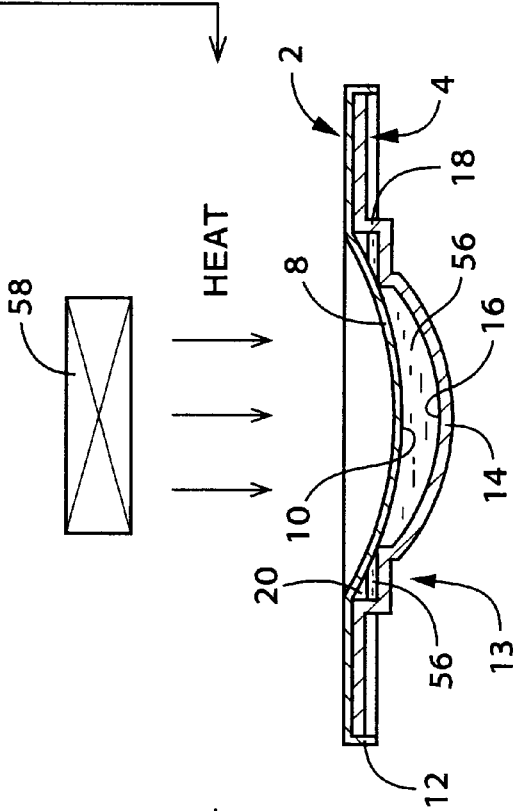

The polymeric material 56 which fills the mold cavity (6) is polymerized according to a known thermal-polymerization method, by exposure to heat emitted from a heater 58, as shown in FIG. 5C, for molding the intended contact lens. The temperature at which the thermal-polymerization of the polymeric material 56 is effected is suitably determined depending upon the kind of the polymeric material 56, for instance. It is preferable that the polymeric material 56 is polymerized at a temperature not lower than 100° C. to avoid insufficient polymerization of the polymeric material 56. In the present embodiment, even when the polymeric material 56 suffers from shrinkage during its polymerization, the excess polymeric material 56 stored in the storage portion 20 flows into the mold cavity (6), so that the contact lens to be molded in the mold cavity (6) has an intended configuration without being adversely influenced by the polymerization shrinkage of the polymeric material 56.

The polymeric material 56 used in the present embodiment is selected from among any known liquid monomer compositions each of which gives a polymer of the intended contact lens. The monomer composition generally includes at least one conventionally used radically polymerizable compound. Alternatively, the monomer composition may be composed of a macromer or a prepolymer. Such a compound includes at least one vinyl, allyl, acryl, and methacryl groups in its molecule, and is conventionally used as a material for a hard contact lens or a soft contact lens. Examples of such a compound include: esters of (meth)acrylic acid such as alkyl (meth)acrylate, siloxanyl (meth)acrylate, fluoroalkyl (meth)acrylate, hydroxyalkyl (meth)acrylate, polyethyleneglycol (meth)acrylate, and polyhydric alcohol (meth)acrylate; styrene and its derivatives; and N-vinyllactam. The monomer composition includes, as needed, a polyfunctional monomer as a cross-linking agent, such as ethyleneglycol di(meth)acrylate or diethyleneglycol di(meth)acrylate. The liquid monomer composition further includes, as additives, a polymerization initiator such as thermal-polymerization initiator or photopolymerization initiatior, and a photosensitizer.

In the present embodiment, both of the male and female molds 2, 4 are layered molds each consisting of the composite sheet 22 including the metal sheet layer 24 therein. Since the layered male and female molds 2, 4 do not permit light transmission therethrough, the polymeric material 56 is polymerized according to the known thermal-polymerization method. The polymeric material 56 may be photopolymerized by exposure to a UV light, for instance, when one of the male and female molds 2, 4 is formed of a transparent material which permits light transmission therethrough.

Figure 5D:
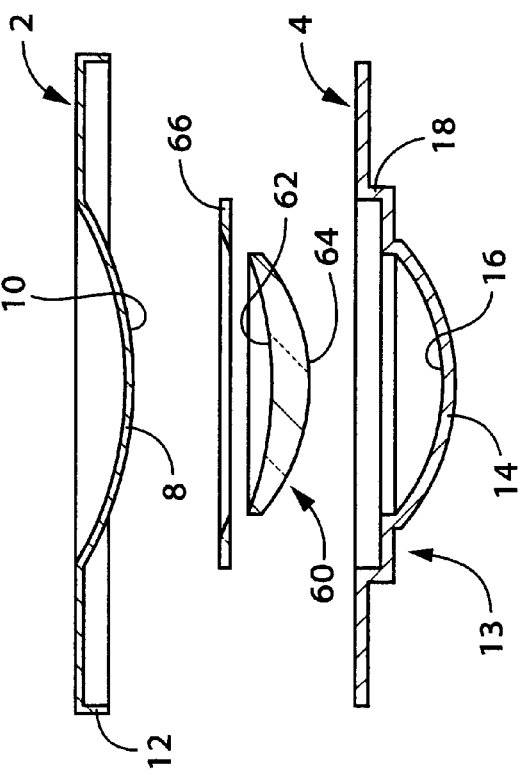

Upon completion of the polymerization of the polymeric material 56, there is obtained the intended contact lens 60 molded between the base curve-molding surface 10 of the male mold 2 and the front curve-molding surface 16 of the female mold 4 so as to have a back surface 62 and a front surface 64 having respective optical portions, as shown in FIG. 5D. Thereafter, the male and female molds 2, 4 are separated away from each other, and the molded contact lens 60 is released from the mold assembly. The molded contact lens 60 is released from the mold assembly by collapsing one of the disassembled male and female molds 2, 4 which holds the molded contact lens thereon, or immersing the above-indicated one mold in a suitable solvent with the molded contact lens adhering to the mold, so that the molded contact lens 60 is removed from the mold. In FIG. 5D, the reference numeral 66 denotes an excess polymerized product obtained as a result of polymerization of the excess polymeric material 56 which have been stored in the storage portion 20.

In the present mold assembly for forming the contact lens 60, each of the male and female molds 2, 4 is constituted by the composite sheet 22 wherein the resin layers 26, 26 are laminated on the opposite surfaces of the metal sheet layer 24 as the core layer. Accordingly, the present male and female molds 2, 4 do not suffer from deterioration of configurational accuracy due to the shrinkage of the resin material during forming of the conventional resin mold. Further, the male and female molds 2, 4 constituted by the composite sheet 22 have high degrees of rigidity and strength enough to withstand the molding operation for forming the intended contact lens 60 and the removal operation of the molded contact lens 60 from the molds 2, 4. Accordingly, the back surface 62 and the front surface 64 of the molded contact lens 60 can be formed with a high degree of dimensional or configurational accuracy corresponding to the base curve-molding surface 10 of the male mold 2 and the front curve-molding surface 16 of the female mold 4, respectively.

The male and female molds 2, 4 of the present embodiment can be easily produced by using the respective presses 28, 42 having the lower and upper dies 30, 32 and the lower and upper dies 44, 46, respectively, each die having a low degree of mechanical strength. As such presses 28, 42, there is employed an inexpensive press which can be operated at a relatively low pressure, such as a pneumatically operated press. Therefore, the present arrangement permits easier and more economical formation of the male and female molds 2, 4 than the conventional arrangement for forming the metal mold by the expensive high-pressure molding. Moreover, the present arrangement significantly reduces the equipment cost required for forming the male and female molds 2, 4, as compared with the conventional arrangement for forming the resin mold by the high-pressure molding such as injection molding. According to the present embodiment, the contact lens 60 which has the intended optical characteristics with high accuracy can be economically produced.

The present male and female molds 2, 4, each of which is constituted by the composite sheet 22 including the metal sheet layer 24 therein, have rigidity and strength enough to withstand the removal operation of the molded contact lens 60 therefrom. Since the base curve-molding surface 10 of the male mold 2 and the front curve-molding surface 16 of the female mold 4 are given by the resin layer 26 of the composite sheet 22, the molded contact lens 60 can be easily removed from the molding surfaces 10, 16 of the male and female molds 2, 4. Therefore, the male and female molds 2, 4 are prevented from being damaged or deformed at their molding surfaces 10, 16, in particular, upon removal of the contact lens 60 therefrom, whereby the male and female molds 2, 4 can be subsequently used in another molding operation to form the contact lens 60.

In the present embodiment, a plurality of contact lenses 60 are successively produced by using single mold assembly consisting of the male and female molds 2, 4. This arrangement is effective to reduce the cost of manufacture of the mold assembly, for thereby reducing the cost of manufacture of the contact lens 60.

The male and female molds 2, 4 are formed by the press forming operation using the respective presses 28, 42. As compared when the male and female molds 2, 4 are produced by a vacuum forming operation which can also be effected at a low pressure, the male and female molds 2, 4 produced by the press forming operation have the molding surfaces 10, 16 whose configurations accurately follow the press forming surfaces 34, 48 of the presses 28, 42, respectively. Therefore, the contact lens 60 molded between the base curve-molding surface 10 of the male mold 2 and the front curve-molding surface 16 of the female mold 4 has accurately formed back and front surfaces 62, 64.

The male and female molds 2, 4 of the present embodiment are assembled together such that the female mold 4 is fitted into the circumferential flange 12 of the male mold 2, so that the two molds 2, 4 are superposed on each other. In this arrangement, the male and female molds 2, 4 are assembled together with the centers of the molding surfaces 10, 16 of the male and female molds 2, 4 being easily aligned with each other. Further, this arrangement is effective to improve the fluid tightness between the two molds 2, 4 at their mating surfaces 9, 15 which are held in closely abutting contact with each other, for thereby preventing entry of the air (oxygen, in particular) into the mold cavity 6. Accordingly, the molding operation for forming the intended contact lens 60 can be readily and easily effected while effectively avoiding insufficient polymerization which would be otherwise caused by a contact of the polymeric material 56 with the oxygen in the mold cavity 6.

In the present embodiment, the polymeric material 56 in the mold cavity 6 is thermal-polymerized by utilizing heat emitted from the heater 58, without requiring expensive equipment for polymerizing the polymeric material 56. Thus, the molding operation for forming the contact lens 60 can be economically effected.

The present male and female molds 2, 4 are formed of the composite sheet 22 wherein the metal sheet layer 24 is sandwiched between the resin layers 26, 26 such that the opposite surfaces of the composite sheet 22 are provided by the resin layers 26, 26. Accordingly, the molding surfaces 10, 16 of the male and female molds 2, 4 constituted by the composite sheet 22 constructed as described above are always provided by the resin layer 26, so that it is not necessary to exercise an utmost care in orientation of the composite sheet 22 in producing the male and female molds 2, 4, resulting in easy and quick forming of the male and female molds 2, 4.

The present mold assembly and method for forming the ophthalmic lens or the lens blank are not limited to the details of the illustrated embodiment, but may be otherwise embodied with various changes, improvements and modifications, which may occur to those skilled in the art, without departing from the scope of the invention defined in the attached claims.

For instance, the principle of the present invention is applicable to a mold assembly for forming an ophthalmic lens other than the contact lens, e.g., an intraocular lens, and a lens blank wherein at least one of its front and back surfaces is subjected to a cutting operation so as to provide one ophthalmic lens. Further, the principle of the present invention is also applicable to a method for forming such an ophthalmic lens and lens blank.

In the illustrated embodiment, both of the male and female molds 2, 4 are layered molds constituted by the composite sheet 22. It is preferable that both of the male and female molds 2, 4 are layered molds so as to form the ophthalmic lens such as a contact lens or an intraocular lens, with high configurational accuracy. When the mold assembly is used for producing the lens blank wherein at least one of its opposite surfaces is to be cut to provide one ophthalmic lens, only one of the male and female molds 2, 4 may be a layered mold, which one mold provides one of the front and back surfaces of the ophthalmic lens that is not to be cut, while the other mold which provides the other of the front and back surfaces of the ophthalmic lens may be a conventional resin mold. When the lens blank formed in the mold assembly is subjected to a cutting operation on one of its opposite surfaces to form the intended lens surface, the lens blank can be sucked and held with high stability at the other surface, i.e., molded surface, by a vacuum chuck having a suction surface whose configuration follows that of the other surface of the lens blank. Accordingly, the cutting operation on the above-indicated one surface of the lens blank can be effected with high stability while the lens blank is held and sucked at the other surface by the vacuum chuck, for thereby effectively forming the intended lens surface.

The configurations of the molding surfaces 10, 16 of the male and female molds 2, 4 defining the mold cavity 6 are not limited to the convex and concave configurations of the illustrated embodiment, but may be suitably determined depending upon the configurations of the ophthalmic lens and the lens blank to be obtained. In producing a convex ophthalmic lens or lens blank, two molds respectively having concave molding surfaces are assembled together to form a mold assembly according to the present invention, instead of the male and female molds as used in the illustrated embodiment.

In the composite sheet 22 of the illustrated embodiment, the metal sheet layer 24 was interposed between the two resin layers 26, 26. The number and arrangement of the metal sheet layer 24 and the resin layer or layers 26 are not limited to those of the illustrated embodiment, provided that the metal sheet layer 24 and the resin layer 26 are superposed on each other. For instance, the composite sheet 22 may consist of the metal sheet layer 24 and only one resin layer 26 which is laminated on one of the opposite surfaces of the metal sheet layer 24. An adhesive layer may be interposed between the metal sheet layer 24 and the resin layer 26 for bonding the metal sheet layer 24 and the resin layer 26 to each other. In the thus formed composite sheet 22, the metal sheet layer 24 and the resin layer 26 can be firmly bonded to each other in a simplified manner, for thereby advantageously and easily forming the layered male and female molds 2, 4. In addition, the composite sheet 22 constructed as described above does not suffer from separation of the resin layer 26 away from the metal sheet layer 24 during molding of the ophthalmic lens or lens blank in the mold assembly, or upon removal of the molded ophthalmic lens or lens blank from the male and female molds 2, 4. Accordingly, the molding operation of the ophthalmic lens or lens blank can be effected with high stability.

What is claimed is:

1. A mold assembly for forming an ophthalmic lens, or a lens blank from which one ophthalmic lens is produced by effecting a cutting operation on at least one of a front surface and a back surface of said lens blank, said mold assembly consisting of a first mold having a molding surface and a second mold having a molding surface, which first and second molds are assembled together so as to define therebetween a mold cavity having a profile corresponding to that of said ophthalmic lens or said lens blank, said mold cavity being filled with a polymeric material which is polymerized to form said ophthalmic lens or said lens blank, wherein the improvement comprises:

at least one of said first and second molds being a layered mold which is constituted by a composite sheet comprising a metal sheet layer and at least one resin layer which are laminated on each other, said at least one resin layer of said composite sheet providing said molding surface of said layered mold which partially defines said mold cavity.

2. A mold assembly according to claim 1, wherein said composite sheet has a thickness of not smaller than 0.06 mm.

3. A mold assembly according to claim 1, wherein said metal sheet layer has a thickness in a range of 0.05~0.3 mm.

4. A mold assembly according to claim 1, wherein said resin layer has a thickness in a range of 0.01~0.2 mm.

5. A mold assembly according to claim 1, wherein said layered mold is formed by a press forming operation on said composite sheet.

6. A mold assembly according to claim 1, wherein said molding surface of said layered mold which provides each of said at least one of said first and second molds, functions as a lens-forming surface which gives a lens surface in which an optical portion of said ophthalmic lens or said lens blank is formed.

7. A mold assembly according to claim 1, wherein said at least one resin layer comprises a pair of resin layers laminated on opposite surfaces of said metal sheet layer.

8. A mold assembly according to claim 1, wherein said composite sheet which constitutes said layered mold further comprises an adhesive layer which is interposed between said metal sheet layer and each of said at least one resin layer, for bonding said metal sheet layer and said at least one resin layer together.

9. A method of forming an ophthalmic lens or a lens blank, by using said mold assembly as defined in claim 1, said method comprising the steps of:

assembling said first and second molds together to define said mold cavity therebetween, at least one of said first and second molds being said layered mold whose molding surface partially defining said mold cavity is provided by said at least one resin layer of said composite sheet;

polymerizing said polymeric material which fills said mold cavity, to form said ophthalmic lens or said lens blank;

separating said first and second molds away from each other; and removing said ophthalmic lens or said lens blank from said first and second molds.

10. A method of forming an ophthalmic lens or a lens blank as defined in claim 9, wherein said polymeric material in said mold cavity is thermal-polymerized.

* * * * *